Jan. 15, 1957  J. W. KORDIG ET AL  2,777,781
TRANSFER SHEET HAVING WAXY TOP PROTECTIVE COATING
Filed March 4, 1955

INVENTORS
JAMES W. KORDIG
GILDO FATO
WALTER A. RACZYNSKI
BY Zabel Baker York Jones and Dithmar
ATTORNEYS

United States Patent Office 2,777,781
Patented Jan. 15, 1957

2,777,781

TRANSFER SHEET HAVING WAXY TOP PROTECTIVE COATING

James W. Kordig, Skokie, Gildo Fato, Bellwood, and Walter A. Raczynski, Park Ridge, Ill., assignors to Ditto, Incorporated, Chicago, Ill., a corporation of West Virginia Application March 4, 1955, Serial No. 492,180

4 Claims. (Cl. 117—36)

This invention relates to improved transfer sheets. It includes transfer sheets, such as carbon paper, typewriter ribbons, hectowriter ribbon, and similar duplicating devices.

More particularly the invention relates to a transfer sheet which consists of a coating tissue on which has been superimposed a waxy or oleaginous transfer composition containing a dye or pigment and which is top coated with a coating which serves to eliminate any staining, marring of the surface, offsetting, bleeding of the dye, or dusting of the dye composition.

Now, it is known, of course, in the art that the above characteristics may be obtained in greater or lesser degree by using a wax or resin coating. Thus, in United States Patent No. 2,188,590, it has been suggested that a resin such as an alkyd resin should be applied to hectograph or transfer sheet in order to improve its performance. The resins are the primary constituent of the coating composition and are applied from a solvent system. In practice, it is found that this leads to many complications. For example, it requires equipment to handle solvent vapors and this equipment must be explosion-proof, solvent vapors must be recovered and operating speeds are markedly affected. There are other problems, but the most serious indictment of this proposal is that it is difficult to remove all traces of solvent and unless this is done there is always a hazard of blocking or migration of the dye component to the surface of the sheet with the production of a particularly dirty sheet instead of obtaining improved performance.

Furthermore, the plasticization of resins with most plasticizers, especially when the composition is made with solvents, gives a coating which is particularly subject to offsetting.

The use of a high proportion of resin, such as alkyd resin also has an adverse effect on release of the transfer composition on making masters.

It is also known that it is possible to use a paraffin wax composition for coating a hectograph carbon or transfer carbon in order to obtain the above desirable effects. Such wax coating compositions are somewhat satisfactory, are considerably easier to apply than a resin applied from a solvent system, but have still certain objections. These include a tendency to offsetting, some possibility of dye migration and a tendency to blocking.

An object of this invention is to overcome the above disadvantages and produce a transfer sheet having improved performance.

Another object of this invention is to provide a transfer sheet having a transfer coating that has an appreciably high sheen which is not only advantageous as regards to attractiveness but also has a practical advantage. Thus, in examination of the hectograph or transfer carbon, it is easy to determine whether complete coverage of the transfer material or hectograph dye has been obtained with a resulting protection of the sheet. Using the standard wax composition a dull finish results which makes inspection a serious problem. This has been recognized and it has been solved to some degree by incorporating in some cases aluminum pigments or other pigmented materials in the wax composition so that coverage may be easily determined during waxing. Such a procedure, however, has some disadvantages, particularly as regards to obtaining good masters with the xerographic process. Accordingly, an object of the invention is to provide a product that has not only sales value, but definite manufacturing value with the resulting production of an improved product, particularly when used with the xerographic process.

We have now found that the above objects can be accomplished by the incorporation of limited amounts of relatively low molecular weight resins such as polyethylene resins having an average molecular weight of between 1200 and 6000 and preferably between 1500 and 2500, essentially in the ratio of 1 to 25% by weight in a waxy transfer composition. A preferred composition consists essentially of 2 to 10% of the polyethylene resin, 90–98% paraffin wax and for particularly advantageous results approximately 1–8% microcrystalline wax.

These compositions can suitably be coated over the transfer composition of a hectograph, planograph or pigment carbon paper by mixing the ingredients, bringing the composition to a molten condition by heating and pouring over the transfer coating at a temperature of 160° F. to 210° F., preferably 180° F.–210° F., and allowing the composition to cool and solidify. Instead of pouring the composition it, of course, may be applied with an applicator roll and bar knife, or by any other technique known to the art. The temperatures also may be varied, it being understood that the wax-resin hot-melt composition should be applied at a lower temperature than the melting temperature of the underlying transfer coating, which may be any of the wax and oleaginous compositions known to the art.

The invention is illustrated in the accompanying drawing in which.

Figure 1:
Fig. 1 is an enlarged sectional view of the smudge-proof transfer sheet of this invention.
Figure 2:
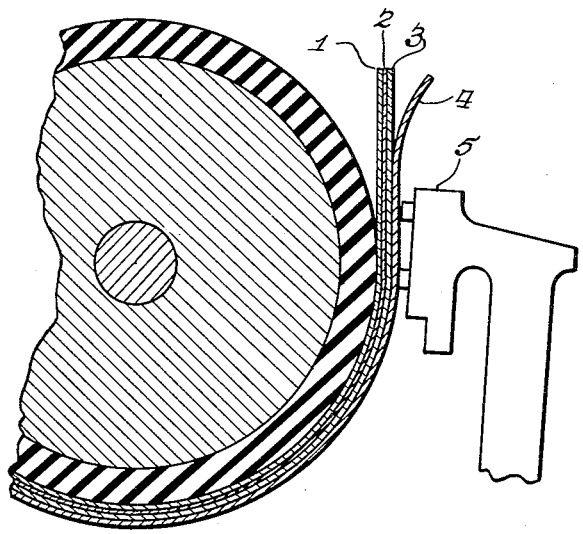
Fig. 2 is a detailed sectional view showing the invention applied to typewriter operation.
Figure 3:
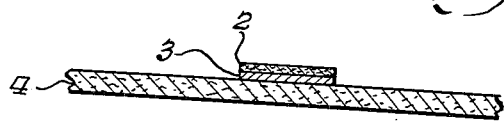
Fig. 3 is an enlarged detailed sectional view of a master sheet containing an impression produced from the transfer sheet of Fig. 1.

Referring to the drawing in which an embodiment of the invention is shown, reference character 1 designates a base sheet such as tissue paper having thereon a transfer coating 2 of a waxy composition containing a hectograph dye, or a pigment, and having a smudge-proof layer 3 of a wax-polyethylene composition over said coating 2.

The following examples illustrate the invention but it will be understood that the invention is not limited to the details of these examples.

*Example 1*

A composition consisting of 98% by weight of paraffin wax and 2% of A. C. Polyethylene No. 201 (a polyethylene resin of 2000 average molecular weight) was heated until molten and then coated in its molten state at a temperature of 190° F. on the waxy transfer coating of a hectograph carbon paper. The hectograph carbon paper was of the usual type, the particular transfer composition on the one we used consisting essentially of 10–12% by weight carnauba wax, 1–6% beeswax, and 40–60% crystal violet dye.

The transfer sheet produced had a high surface sheen, showed practically no dye migration, and substantially no offsetting when used in the typewriter.

Example 2

The above procedure was repeated using a non-smudging coating composition consisting of 95% paraffin wax, 2% microcrystalline wax and 3% of a polyethylene resin of average molecular weight of 2000 and melting point of 99° C.

The use of the microcrystalline wax gave increased adhesion with the other advantages of the composition of Example 1.

The following are some additional examples of wax-polyethylene resin mixtures which give suitable high gloss protective coatings on transfer sheets. The proportions are by weight. The polyethylene resin used had an average molecular weight of 2000 and a melting point of 90° C.–102° C.

Example 3

| | Percent |
|---|---|
| Carnauba wax | 80 |
| Beeswax | 14 |
| Polyethylene resin | 6 |

Example 4

| | Percent |
|---|---|
| Paraffin wax | 80 |
| Beeswax | 14 |
| Polyethylene resin | 6 |

Example 5

| | Percent |
|---|---|
| Montan wax | 80 |
| Microcrystalline wax | 14 |
| Polyethylene resin | 6 |

Example 6

| | Percent |
|---|---|
| Sugar cane wax | 80 |
| Microcrystalline wax | 14 |
| Polyethylene resin | 6 |

Example 7

| | Percent |
|---|---|
| Carnauba wax | 80 |
| Polyethylene resin | 20 |

Example 8

| | Percent |
|---|---|
| Paraffin wax | 75 |
| Microcrystalline wax | 15 |
| Carnauba wax | 5 |
| Polyethylene resin | 5 |

Other waxes may be used in place of the waxes of the examples, as for example, Java wax, and the solid polyethylene glycols with molecular weights above 1000 sold under the trade name of "Carbowax."

Other polyethylene resins, viz. A. C. Polyethylene No. 6, 7, 615 and 617 of molecular weight between 1200 and 6000 may be substituted for the particular polyethylene resins of the examples with substantially the same results. With lower molecular weights and lower proportion of resin than 1% the increased sheen and decreased dye migration becomes little better than straight paraffin wax and therefore is not recommended. With higher molecular weights and higher proportions of resin than 25% its letdown is substantially lessened and the melting point increased so that molten coating is difficult.

While there has been shown and described certain preferred forms of the invention, it is to be understood that it is capable of many modifications on disclosure to one skilled in the art. Changes, therefore, may be made without departing from the spirit and scope of our invention as described in the appended claims and which is our intention to claim all novelty inherent in this invention as broadly as possible. We, accordingly, consider this process to apply to the overcoating of hectograph carbon, of pigmented record carbon, of printing process type carbons such as are common for use with direct image mats or in lithographic applications as well as other modifications of these carbons including ribbons, tapes, and similar duplicating devices.

We claim:

1. A transfer sheet adapted for use with a pressure or impact instrumentality such as a pencil or the keys of a typewriter, comprising a base coated with a transfer composition, and a film essentially comprising a wax containing a minor proportion of a polyethylene resin coated on said transfer composition, a polyethylene resin having a molecular weight of at least approximately 1200 and present in at least approximately 1% with the wax as to give substantially increased sheen and reduced offsetting over the wax composition free of the polyethylene resin.

2. A transfer sheet adapted for use with a pressure or impact instrumentality such as a pencil or the keys of a typewriter, comprising a base coated with a transfer composition containing a hectograph dye, and a film essentially comprising a wax containing a minor proportion of a polyethylene resin coated on said transfer composition, the polyethylene resin having a molecular weight of at least approximately 1200 and present in at least approximately 1% with the wax as to give substantially increased sheen and reduced dye migration.

3. A transfer sheet comprising a base sheet coated with a transfer composition containing a hectograph dye and having a coating thereon of a composition essentially comprising paraffin wax from 75 to 99% by weight and a polyethylene resin of average molecular weight between 1200 and 6000 present in from 1 to 25% by weight.

4. A transfer sheet comprising a base sheet coated with a transfer composition containing a hectograph dye and having a coating thereon of a composition essentially comprising paraffin wax from 90 to 98%, microcrystalline wax 1 to 8%, and polyethylene resin of average molecular weight between 1200 and 2500 in proportion of 2 to 10% by weight.

References Cited in the file of this patent

UNITED STATES PATENTS

| | | |
|---|---|---|
| 2,188,590 | Bjorksten | Jan. 30, 1940 |
| 2,611,313 | Keller | Sept. 23, 1952 |
| 2,671,734 | Rosenblum | Mar. 9, 1954 |

FOREIGN PATENTS

| | | |
|---|---|---|
| 705,167 | Great Britain | Mar. 10, 1954 |